(12) United States Patent
Merette (10) Patent No.: US 9,278,723 B2
(45) Date of Patent: Mar. 8, 2016

(54) RECUMBENT VEHICLE

(71) Applicant: Co2Zero, Inc., Quebec (CA)

(72) Inventor: Marcel Merette, Quebec (CA)

(73) Assignee: Co2Zero Inc., Quebec (CA)

( * ) Notice: Subject to any disclaimer, the term of this patent is extended or adjusted under 35 U.S.C. 154(b) by 46 days.

(21) Appl. No.: 14/224,411

(22) Filed: Mar. 25, 2014

(65) Prior Publication Data

US 2014/0284898 A1 Sep. 25, 2014

Related U.S. Application Data

(60) Provisional application No. 61/805,018, filed on Mar. 25, 2013.

(51) Int. Cl.
*B62K 3/00* (2006.01)
*B62K 5/02* (2013.01)
*B62K 5/06* (2006.01)

(52) U.S. Cl.
CPC . *B62K 3/005* (2013.01); *B62K 5/02* (2013.01); *B62K 5/06* (2013.01)

(58) Field of Classification Search
CPC .... B62K 2005/001; B62K 3/005; B62K 5/02; B62K 5/07; B62K 5/08
USPC .......................... 280/266, 267, 277, 282, 283
See application file for complete search history.

(56) References Cited

U.S. PATENT DOCUMENTS

| | | | |
|---|---|---|---|
| 4,198,072 A * | 4/1980 | Hopkins | 280/282 |
| 4,432,561 A | 2/1984 | Feikema et al. | |
| 4,456,277 A | 6/1984 | Carpenter | |
| 4,572,535 A | 2/1986 | Stewart et al. | |
| 4,789,173 A * | 12/1988 | Lofgren et al. | 280/288.1 |
| 4,826,190 A | 5/1989 | Hartmann | |
| 5,853,184 A * | 12/1998 | Lofgren et al. | 280/242.1 |
| 6,062,581 A | 5/2000 | Stites | |
| 6,572,130 B2 * | 6/2003 | Greene et al. | 280/266 |
| 8,448,954 B2 * | 5/2013 | Wilson | 280/11.27 |
| 2009/0184488 A1 * | 7/2009 | Dixon | 280/202 |

* cited by examiner

*Primary Examiner* — Joseph Rocca
*Assistant Examiner* — Marc A Scharich
(74) *Attorney, Agent, or Firm* — Timothy D. Bennett; Emerson Thomson Bennett (57) ABSTRACT

A recumbent vehicle is disclosed, which generally consists of a front, seat and rear chassis. The seat chassis is operatively connected to upper and lower pivot joints, which allow for the seat chassis, and thus the rider, to move independently from the remainder of the vehicle. The upper and lower pivot joints are each comprised of subcomponents such as spherical axial bearings along with a coil to create the independent movement, which manifests itself during turns and when hitting obstacles on the terrain. The rider can control the direction of the recumbent vehicle by using a steering arm.

10 Claims, 14 Drawing Sheets

RECUMBENT VEHICLE

This application claims priority from U.S. Provisional Patent Application No. 61/805,018 filed Mar. 25, 2013, entitled RECUMBENT VEHICLE.

I. BACKGROUND

A. Field of the Invention

The invention relates generally to human-powered transportation and specifically to recumbent vehicles.

B. Description of Related Art

Bicycles have become a common mode of human-powered transportation. In conventional so-called upright bicycles, such as multi-speed racing bicycles and mountain style bicycles, the seat is positioned between and above the wheels while, the pedal assembly is positioned essentially vertically downward from the seat.

Conventional so-called upright bicycles suffer from a set of drawbacks. One of the main drawbacks associated with the so-called upright bicycles is that a relatively high proportion of the effort expanded by the rider is used to overcome wind resistance. Another drawback of the conventional upright bicycles relates to the fact that the rider sits relatively high away from the ground and that in the event that a high degree of deceleration is achieved, the rider may be projected forwardly. Furthermore, hard braking can also lead to severe skidding of the tires. A still further drawback of the conventional so-called upright bicycles is the general lack of ergonomic characteristics associated with the rider's position. An upright bicycle is also difficult to balance when at rest and the rider typically has to lower his or her foot to balance the bicycle. When carrying cargo on the frame itself, the upright bicycle becomes all the more unstable in motion as the added weight shifts from side to side.

In order to overcome the above-mentioned disadvantages, another type of human-powered transport has evolved throughout the years, namely the so-called recumbent tricycle. A recumbent tricycle differs from a conventional upright bicycle in that the rider sits behind the foot pedals in a recumbent or reclining position on a seat that is usually provided with a backrest, and the tricycle has three wheels (although some recumbent have a 2 wheel version). The recumbent tricycle may have two wheels in front and one in the rear, known as a "tadpole" design, or two wheels in the rear and one in the front, known as a "delta" design.

Unlike in an upright bicycle in which the rider's legs extend generally downwardly, in a recumbent tricycle, the rider's legs extend forwardly substantially parallel to the ground. As such, the combined frontal area of a recumbent tricycle and rider is typically substantially less than in a conventional upright-type bicycle, thus causing less wind resistance.

Furthermore, a lower center of gravity, greater tire contact due to three wheels and a feet-forward riding position mean that a higher degree of deceleration can be achieved without the rider being projected forward, as he or she might on a conventional bicycle. The risk of injury to the body due to contact with the handlebars, brakes and gear shift levers is reduced in the event that the rider is thrown forward. The feet being positioned in front of the rider, they are most likely to make contact in a head-on collision, often bracing the rider and preventing substantial injury. The rider rarely goes over the handlebars, resulting in fewer head injuries, and the low centre of gravity means the rider has a reduced distance to fall before contacting the ground.

Moreover, during pedalling, the loads applied to the rider's body against the seat in reaction to the forces applied to the foot pedals by the rider's legs are transmitted to the seat through the hips and shoulders of the rider, similar to the effect of a contact point on a lever. This enables the upper torso and arms of the rider to remain relaxed while full power is being applied to the foot pedals.

Furthermore, the seat of a recumbent tricycle typically supports more of the rider's body area, including his back, so that the weight of the rider is distributed over a larger surface for greater comfort. This may also be more suitable for people with balance or limb disabilities. Also, the recumbent position allows for greater thrust power since the back of the rider can be braced against the seat. In an upright bicycle, the maximum thrust is limited by the weight of the rider, although this can be helped if the rider pulls up on the handlebars while pushing down on the pedals.

Finally, and with particular reference to the present recumbent tricycle, the seat of recumbent tricycle can be supported by way of pivot joints such that said seat moves semi-independently to the remainder of the recumbent tricycle chassis. In this instance, the centrifugal force as experienced by the driver is lessened as said driver can move, to a certain extent, in the same direction as the centrifugal force. Further, the resulting suspension of the recumbent tricycle's seat is better suited to absorb shock resulting from debris or imperfections on the road.

A recumbent tricycle in the delta configuration, with two rear wheels and one front wheel, has some specific advantages relative to the tadpole configuration, such as the possibility of an expanded cargo capacity.

Although recumbent tricycles have been the subject of previous patents and patent applications, some of the prior art recumbent designs suffer from a further set of drawbacks. For instance, U.S. Pat. No. 6,062,581 describes a recumbent tricycle in a delta configuration, in which only the front wheel turns in the direction in which the rider would like to go, and the front portion of the frame remains in a forward orientation. This type of steering is unstable when cornering at higher speeds because the front portion of the frame is unable to lean into the turn.

Another example, U.S. Pat. No. 4,826,190 discloses a tricycle in a delta configuration, with rear-wheel drive and a fork-mounted front wheel that pivots by means of turning the fork. A rear-wheel drive mechanism for a tricycle in a delta configuration is complex, expensive and requires heavier hardware. For instance, it will require a full axle to transmit power to both wheels, and a differential gear, for example, to permit the wheel on the outside of the turn radius to turn faster than the wheel on the inside of the turn radius. It will also call for a longer drivetrain to transfer power to the rear from the front crankset.

Yet another example of the prior art, U.S. Pat. No. 4,456,277 discloses a tricycle in a tadpole configuration, with the two front wheels serving as the drive wheels. Again, this type of configuration requires a differential which adds cost, and it is more difficult to get into and out of than a delta configuration. The tadpole configuration also does not offer an obvious way to store and carry cargo.

In another patent, U.S. Pat. No. 4,432,561 discloses a two-pivot tricycle in delta configuration, which contains a center joint so that the seat, pedals and front wheel pivot in the direction in which the rider would like to travel. The pivot disclosed is comprised of a cam bearing, wedged in between a pin and a housing. Unfortunately, said pivot system cannot provide for an efficient inclination as the cam bearing has very little give and the tubes constitute welded pieces one onto another. In other words, the more stressed the system becomes, the more pressure that will result on the overall tricycle's chassis.

Finally, U.S. Pat. No. 4,572,535 discloses another type of two-pivot tricycle, wherein said pivot is comprised of a bolt, pivotally fastened on one end to a bolt hole, and on the other end to a nut. In between said bolt hole and nut lies a spacer, whereby when side to side movement occurs on the tricycle, the bolt can pivot around the bolt hole, and compresses the spacer on either side, depending on the movement in order to compensate for said movement. However, depending on the size and suppleness of the spacer, the tricycle is restricted in terms of movement. Further, the spacer-style pivot is not an appropriate substitute for a proper coil or spring suspension to create a comfortable experience for riders.

II. SUMMARY OF THE INVENTION

In a first aspect, the present invention provides a recumbent vehicle comprising a front chassis having a front wheel to provide a first point of support; a seat chassis secured to the front chassis for providing seating; a rear chassis pivotally connected to the seat chassis and having at least one rear wheel to provide a second point of support; upper and lower pivot joints operatively engaged with the seat and rear chassis allowing the seat chassis to move independently from the front and rear chassis; and a steering arm fastened to the rear chassis to steer the recumbent vehicle.

III. BRIEF DESCRIPTION OF THE DRAWINGS

It will now be convenient to describe the invention with particular reference to one embodiment of the present invention. It will be appreciated that the diagrams relate to one embodiment of the present invention only and are not to be taken as limiting the invention.

IV. DETAILED DESCRIPTION OF THE DRAWINGS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

Figure 1:
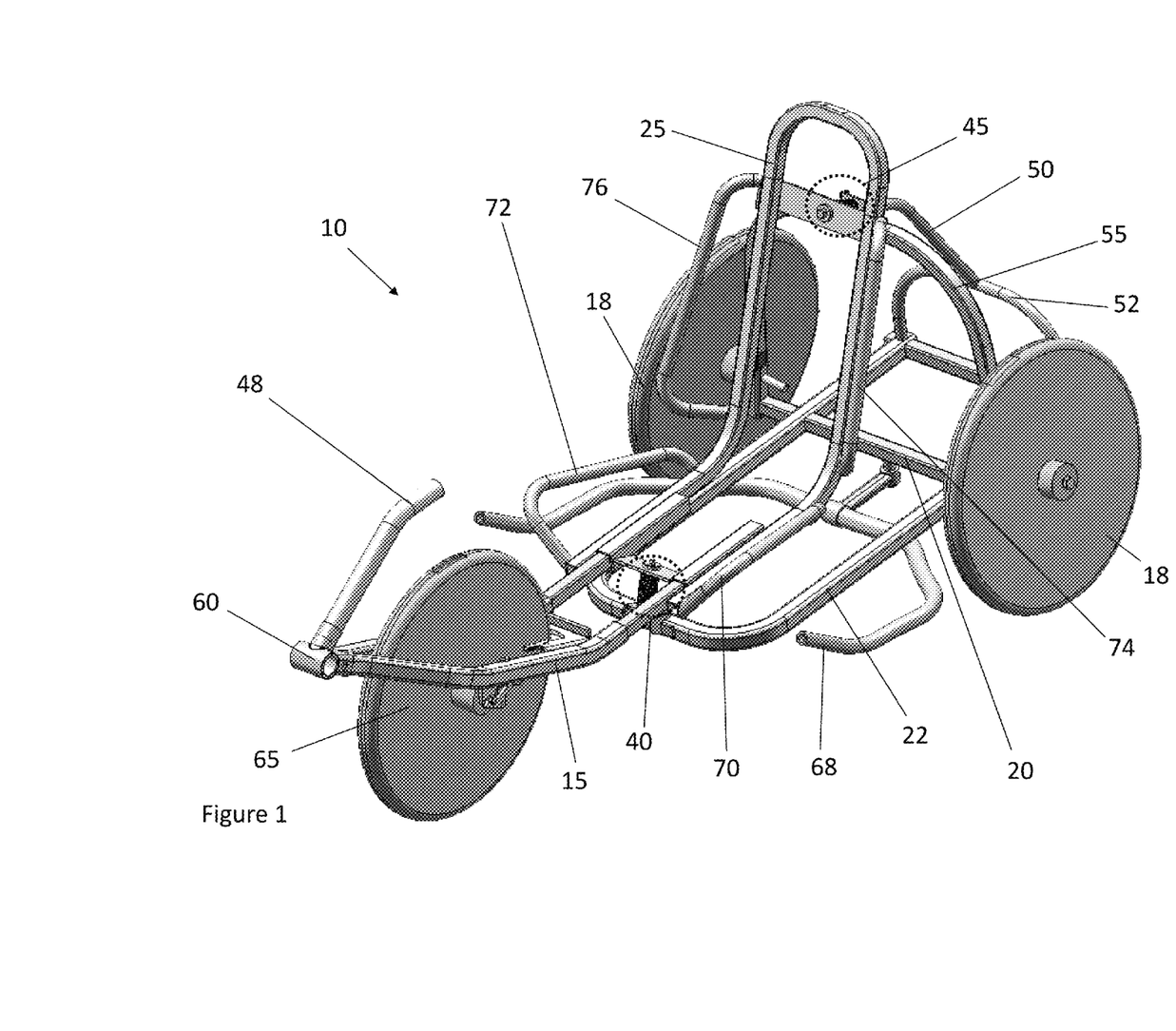
FIG. 1 is a front perspective view of the recumbent vehicle, according to one embodiment of the present invention.
Figure 1A:
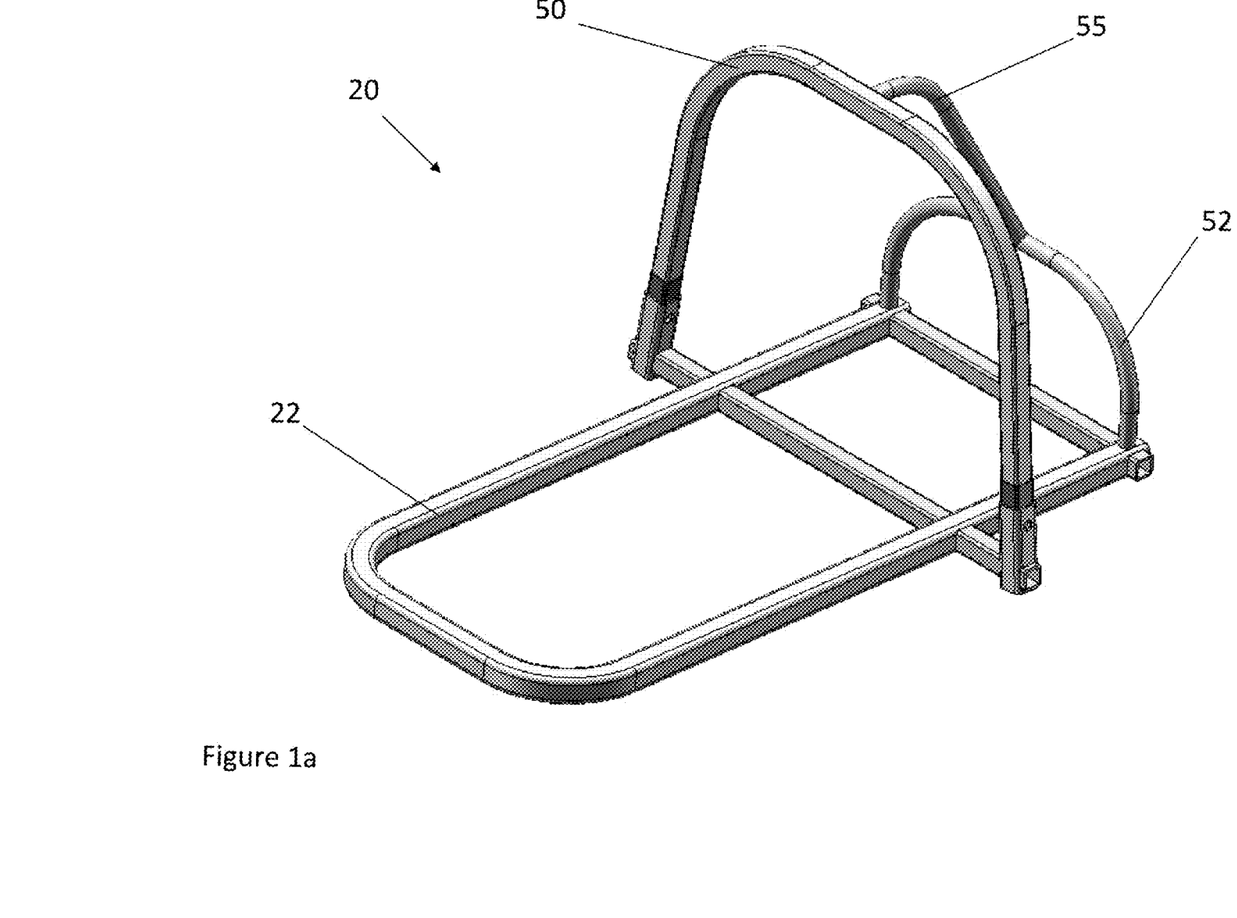
FIG. 1a is a front perspective view of a rear chassis of the recumbent vehicle, according to one embodiment of the present invention.

With reference to FIGS. 1 and 1a and according to one embodiment of the present invention, a recumbent vehicle 10 is shown, consisting generally of front, rear and seat chassis 15, 20 25. The rear chassis 20 is further comprised of sub-components consisting of upper and lower arches 50, 52, brace 55 and base support 22 as specifically shown in FIG. 1a. The front chassis 15 is secured to the lower section of the seat chassis 25 by means of connecting and receiving brackets (not shown), and said front chassis 15 is engaged with the front wheel 65. In turn, the seat chassis 25 is pivotally connected to the rear chassis 20 by means of operative engagement with lower and upper pivot joints 40, 45. Specifically, the lower pivot joint 40 pivotally connects the seat chassis 25 to the base support 22 of the rear chassis 20, while the upper pivot joint 45 pivotally connects the seat chassis 25 to the upper arch 50 of the rear chassis 20. Rear wheels 18 are engaged to the rear chassis 20 to allow for forward or rearward propulsion. A seat (not shown) is normally positioned into the seat chassis 25, such that a rider can sit in said seat to pedal the recumbent vehicle 10. While the pedals, derailleur, sprocket and roller chain are not shown, said pedals, derailleur, sprocket and roller chain would be present in the recumbent vehicle 10 in order for the cyclist to pedal and move forward. Said pedals would be located on the pedal bracket 60, which could be operatively connected to the roller chain which in turn would be operatively connected to the front wheel 65 such that the rotation of the pedals would engender a corresponding rotation of the front wheel 65 and thus move the recumbent vehicle 10 in a forward motion. A derailleur support 48 is also shown, fastened to the front end of the front chassis 15 near the pedal bracket 60. Said derailleur support 48 allows for easy changing of sprockets (not shown), and also acts as a handle that can be utilized, when the rider is seated, to lift the front portion of the recumbent vehicle 10 and effectuate 180-degree turns. The derailleur support 48 also provides the rider with support for balance when getting in or out of the recumbent vehicle 10, and allows the rider to easily pick up the lightweight recumbent vehicle 10 when said rider is standing upright and hang it from an elevated beam for maintenance or storage. Finally, the derailleur support 48 also allows the rider to secure to it a front wing, or deflectors, or other suitable accessories for the front of the recumbent vehicle 10. First, second, third and fourth seat supports 70, 72, 74, 76 are also shown, which form part of the seat chassis 25. In order for the rider to properly sit in the recumbent vehicle 10, a material is affixed between first and second seat supports 70, 72 and another material is affixed between third and fourth seat supports 74, 76 such that the rider has a place to rest his or her posterior as well as his or her back.

To effectuate a turn, the rider uses steering arm 68, fastened to the rear chassis 20, to control the direction of the recumbent vehicle 10. When the rider exerts pressure onto either side of the steering arm 68, the recumbent vehicle 10 will steer in the desired direction by means of front and rear wheels 65, 18 which provide a first and second point of support to the ground, respectively. The same turn can be achieved by leaning the body of the rider in the direction in which it is desired to turn. Said steering arm 68 will also connect with other components such as gear shifter (not shown) or brake actuator (not shown), and other components as habitual on a steering handle of a bicycle and known in the relevant art. The lower and upper pivot joints 40, 45 are present to enable the rider to absorb less shock when hitting obstacles on the road, and lessen the centrifugal force exerted onto the driver when the recumbent vehicle 10 is steering left or right. The functioning and purpose of the lower and upper pivot joints 40, 45 is further described below.

Figure 2:
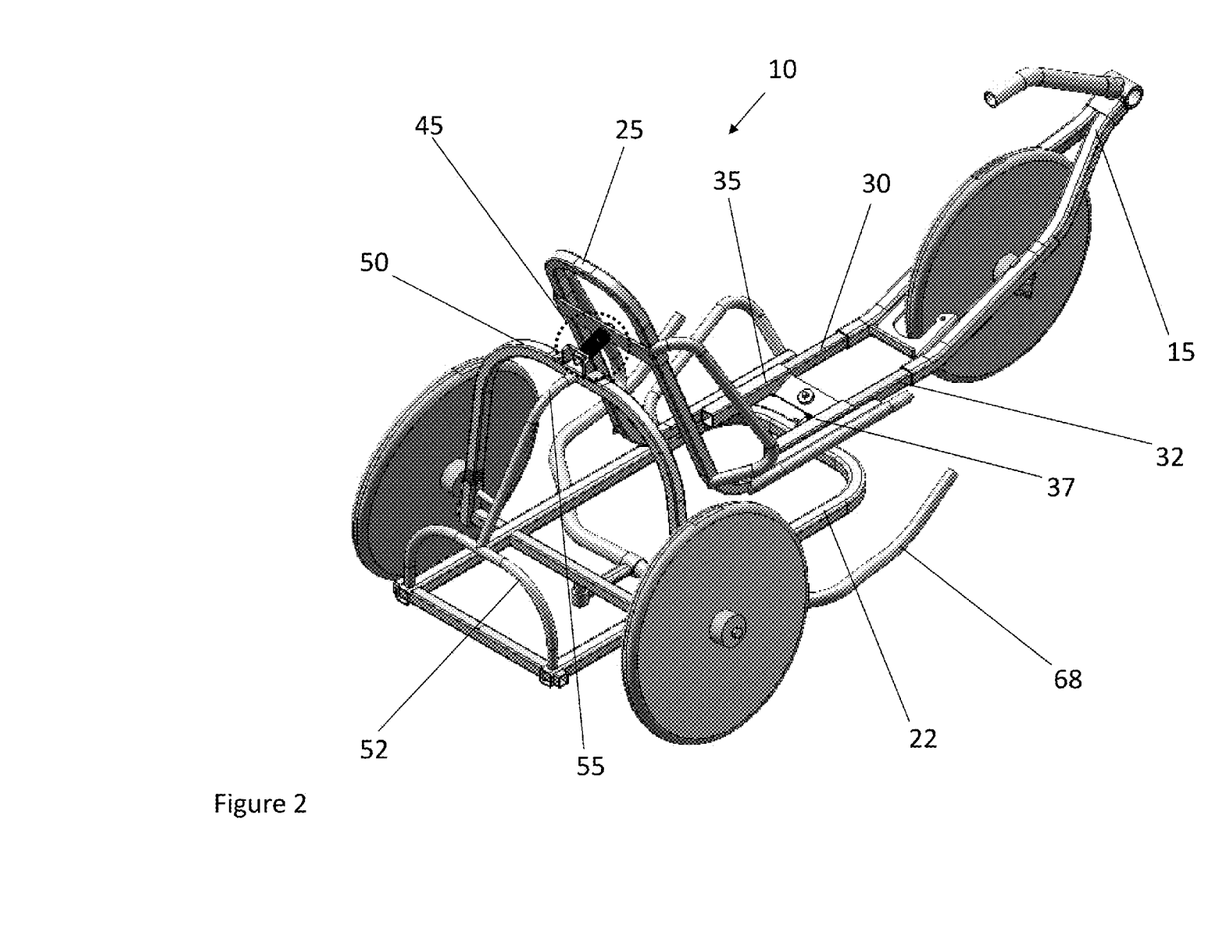
FIG. 2 is a rear perspective view of the recumbent vehicle, according to one embodiment of the present invention.

With reference to FIGS. 1a and 2 and according to one embodiment of the present device, the rear chassis 20 is comprised of upper and lower arches 50, 52, brace 55 and base support 22. Said upper and lower arches 50, 52 are designed to provide support for the support base 22 of the rear chassis 20 of the recumbent vehicle 10, as well as for the force exerted thereupon by upper pivot joint 45 during acceleration and turning. The first and second connecting brackets 30, 32 are shown in greater detail, secured to the front chassis 15 and inserted into first and second receiving brackets 35, 37 which are in turn fastened to the seat chassis 25, thereby providing the connection between said front chassis 15 and said seat chassis 25. The operative connection between the front and seat chassis 15, 25 enables the rider to either exert pressure on the steering arm 68, or lean onto the right or left side of the seat chassis 25 to engender a corresponding movement from the front chassis 15 and thus effectuate a turn in the desired direction.

Figure 3:
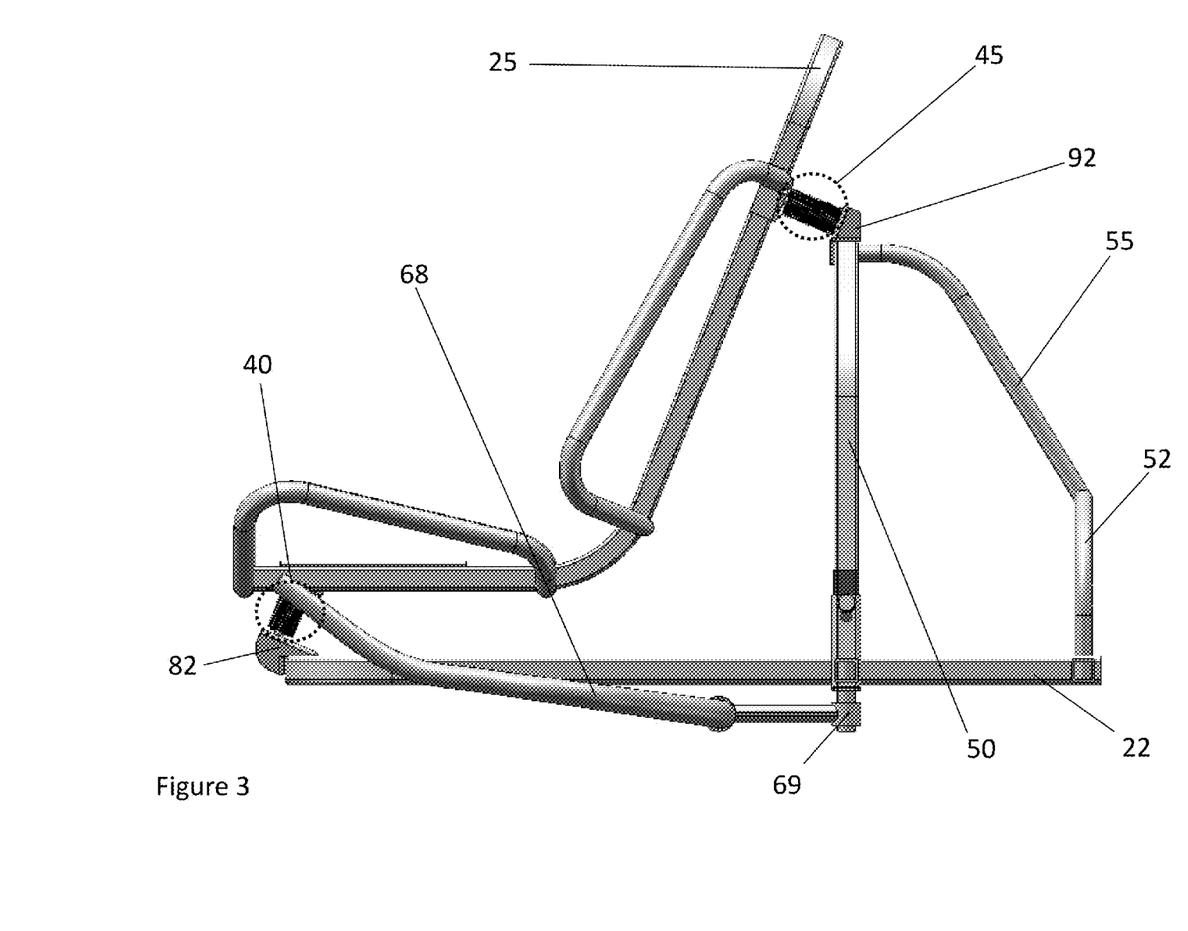
FIG. 3 is a side view of the seat and rear chassis of the recumbent vehicle, according to one embodiment of the present invention.

With reference to FIG. 3 and according to one embodiment of the present device, the position of the lower and upper pivot joints 40, 45 is shown with respect to the lower and upper sections of the seat chassis 25. Said lower and upper section of the seat chassis 25 are pivotally connected to the base support 22 and the upper arch 50, respectively. Specifically, the lower pivot joint 40 is secured in between a first lower pivot bracket (not shown) and a second lower pivot bracket 82, while the upper pivot joint 45 is secured in between a corresponding first upper pivot bracket (not shown) and second upper pivot bracket 92. All of the pivot brackets 80, 82, 90, 92 have an aperture (not shown) to which can be loosely secured the lower and upper pivot joints 40, 45 such that there is enough give to allow said lower and upper pivot joints 40, 45 to restrictedly rotate around the axis of the aperture (not shown). This motion allows for a certain amount of corresponding movement from the seat chassis 25. Indeed, as the recumbent vehicle 10 sways or oscillates from side to side during turning, the lower and upper pivot joints 40, 45 absorb part of the shock and allow the seat chassis 25 to move independently of the rest of the recumbent vehicle 10, thus reducing both the amount of centrifugal force as experienced by the driver, and the sliding and tilting of the front, rear, and seat chassis 15, 20, 25. Said improvement created by the lower and upper pivot joints 40, 45 facilitate turning and greatly improve the stability of the recumbent vehicle 10. The steering arm 68 is shown connected to the support base 22 by means of a support member 69.

Figure 4:
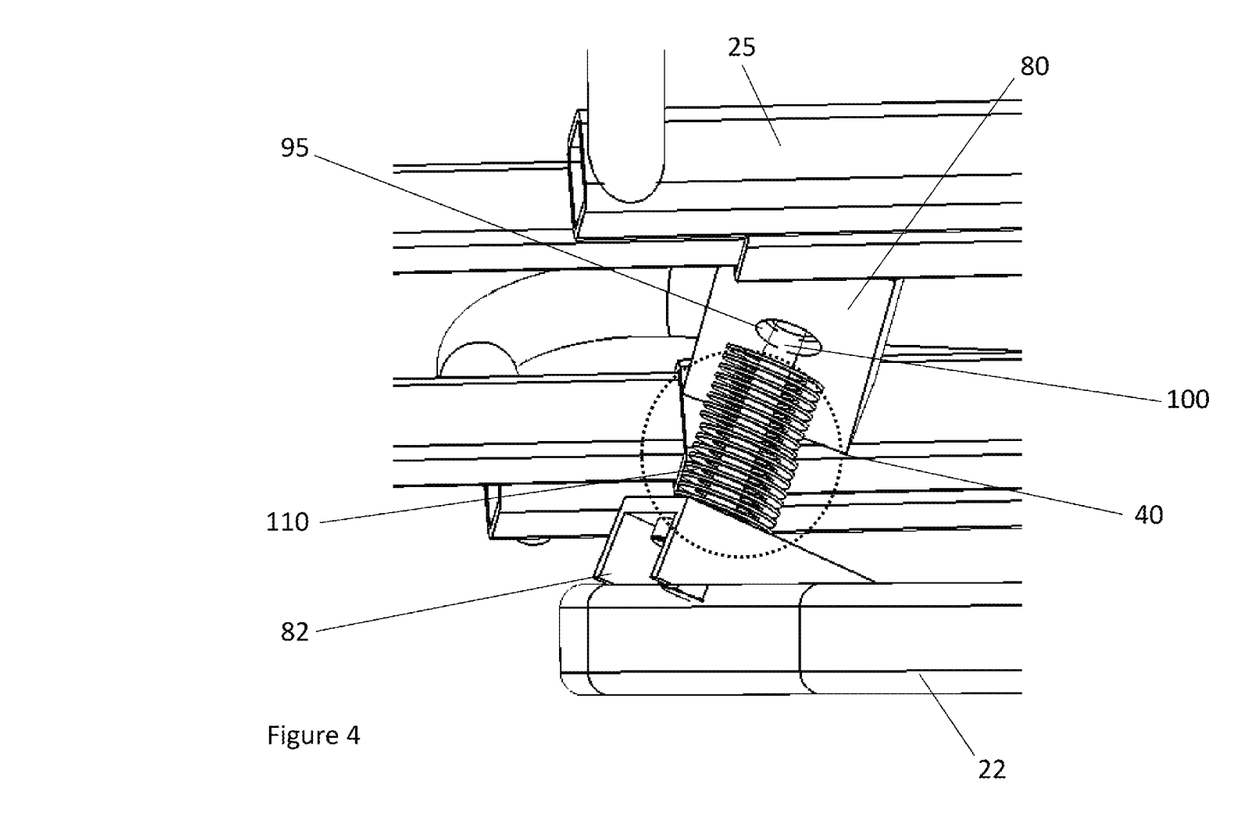
FIG. 4 is a perspective view of the lower pivot joint positioned onto the recumbent vehicle, according to one embodiment of the present invention.

With reference to FIG. 4 and according to one embodiment of the present device, the lower pivot joint 40 is shown connected to both the seat chassis 25 and the base support 22. Specifically, the lower pivot joint 40 is loosely secured within an aperture 95 of the first and second lower pivot brackets 80, 82. In turn, said first and second lower pivot brackets 80, 82 are each welded to the seat chassis 25 and base support 22, respectively. As is shown, the width of the bolt 100 of the lower pivot joint 40 is lesser than the circumference of the aperture 95 such that the lower pivot joint 40 can restrictedly rotate around the circumference of the aperture 95. In this embodiment, the width of the bolt 100 is 1.27 cm (0.5 inches) while the diameter of the aperture 95 is 1.59 cm (0.625 inches) allowing approximately 0.32 cm (0.125 inches) of play. Meanwhile, the circumference of the coil 110 is wider than the circumference of the aperture 95 such that the coil must compress and expand in the confined space defined by the distance between the first and second lower pivot bracket 80, 82. In this embodiment, the circumference of the coil 110 is 3.81 cm (1.5 inches) while the length of the coil 110 is 7.62 cm (3 inches) compressed to 6.35 cm (2.5 inches). However, these specifications can be approximate without departing from the scope of the invention, as a different length and circumference of the coil 110 can be utilized for lighter or heavier riders, or riders who enjoy different force in suspension.

Figure 4A:
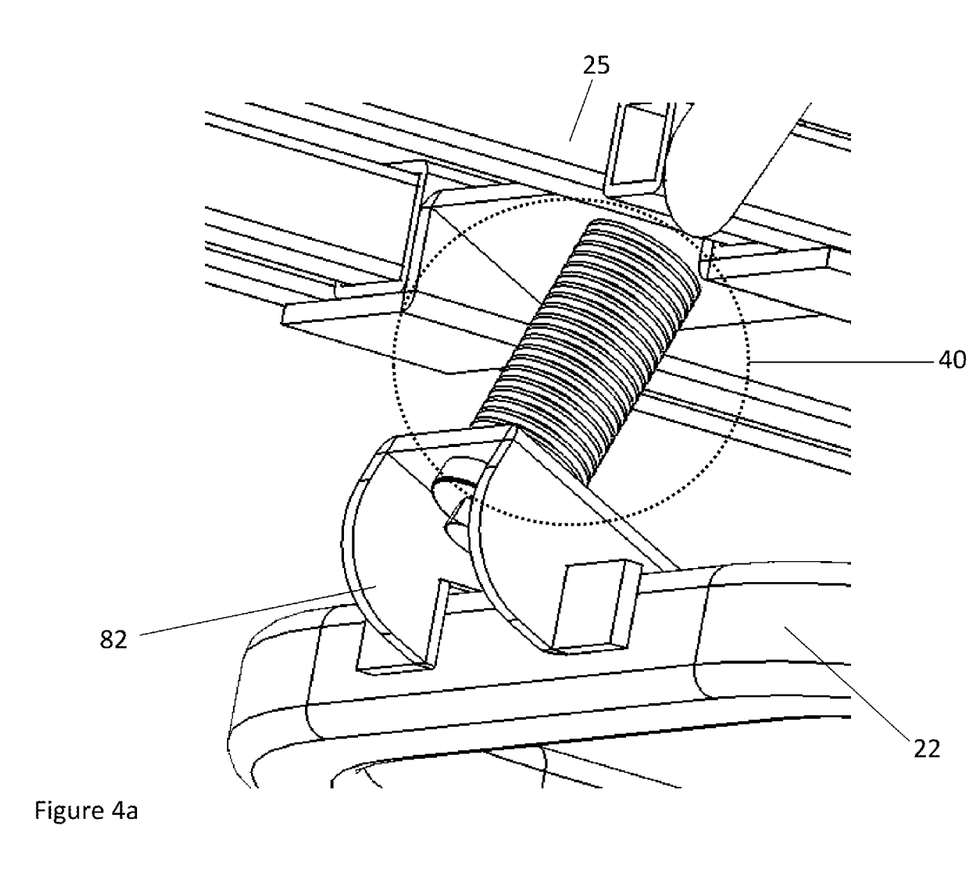
FIG. 4a is a perspective view of the lower pivot joint positioned onto the recumbent vehicle, according to another embodiment of the present invention.

With reference to FIG. 4a and according to another embodiment of the present device, a variant shape of the first and second lower pivot brackets 80, 82 are shown welded to the seat chassis 25 and base support 22 of the rear chassis (not shown) in a different configuration. The lower pivot joint 40 still serves the same purpose; however, a worker skilled in the art would appreciate that the first and second lower pivot brackets 80, 82 can be of various shapes and sizes while still performing in the same manner.

Figure 5:
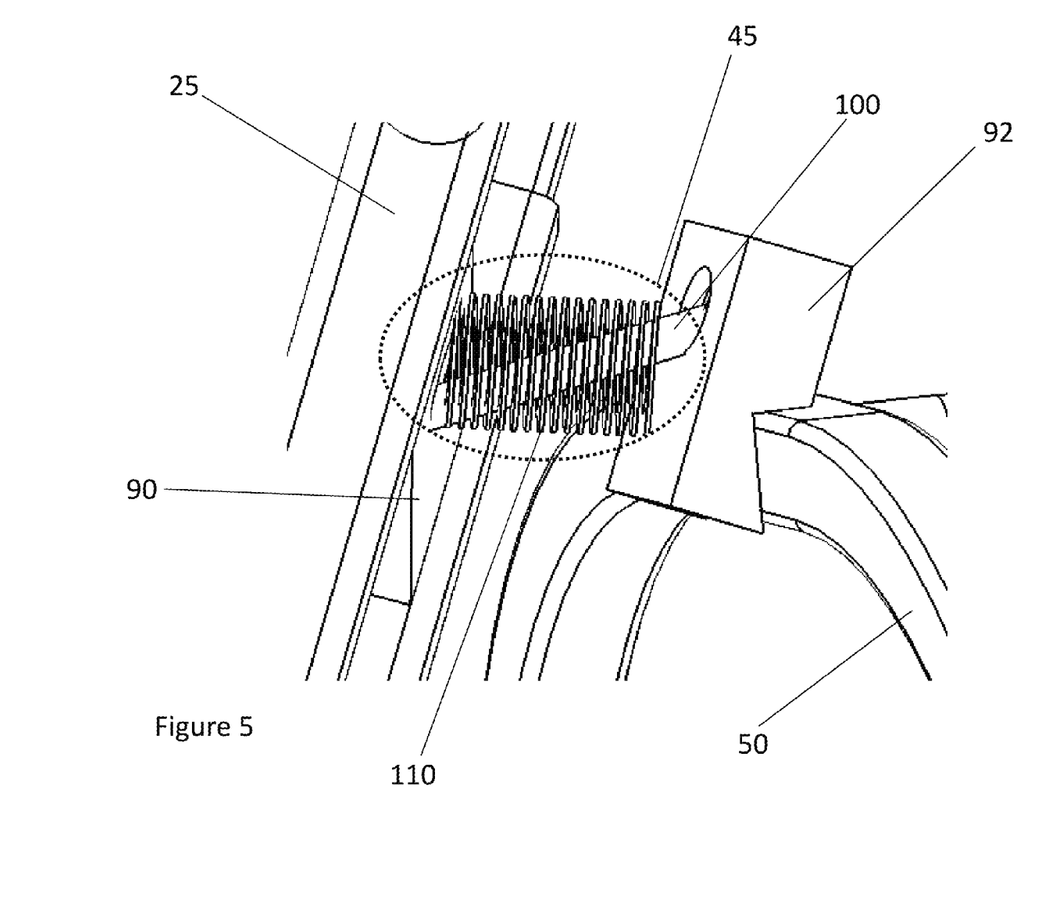
FIG. 5 is a perspective view of the upper pivot joint positioned onto the recumbent vehicle, according to one embodiment of the present invention.

With reference to FIG. 5 and according to one embodiment of the present device, the upper pivot joint 45 is shown connected to both the seat chassis 25 and the upper arch 50 of the rear chassis (not shown). Specifically, the upper pivot joint 45 is loosely secured within an aperture 95 of the first and second upper pivot brackets 90, 92. In turn, said first and second upper pivot brackets 90, 92 are each welded to the seat chassis 25 and upper arch 50 of the rear chassis (not shown), respectively. As is shown, the width of the bolt 100 of the upper pivot joint 45 is lesser than the circumference of the aperture 95 such that the upper pivot joint 45 can restrictedly rotate around the circumference of the aperture 95, in exactly the same fashion as the lower pivot joint (not shown). In fact, the above referenced dimensions for the bolt 100 and aperture 95 apply here as well. The circumference of the coil 110 is wider than the circumference of the aperture 95 such that the coil must compress and expand in the confined space defined by the distance between the first and second upper pivot bracket 90, 92, identically as in the case with the lower pivot joint 40. Again, the dimensions discussed above apply here as well.

Figure 5A:
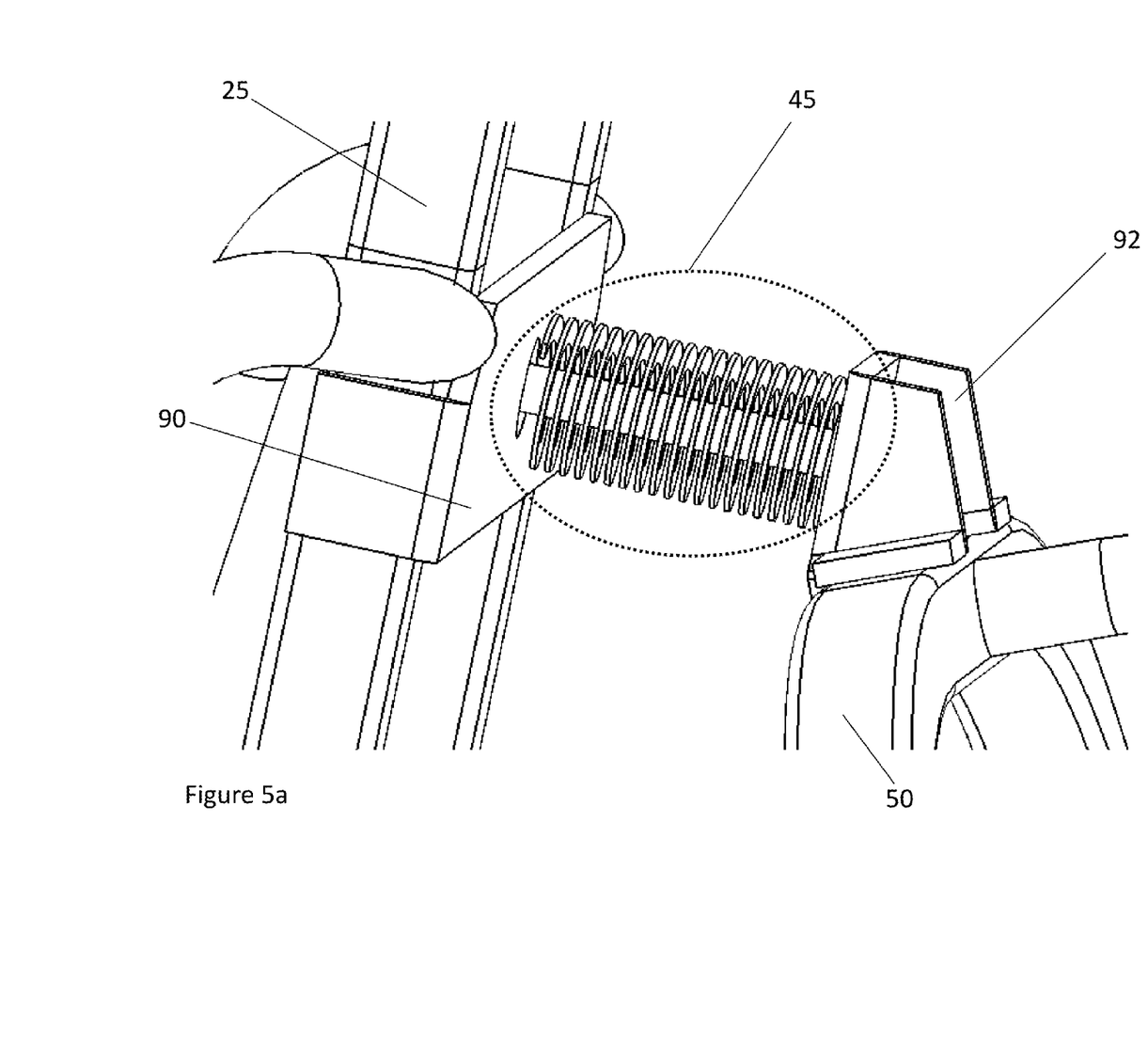
FIG. 5a is a perspective view of the upper pivot joint positioned onto the recumbent vehicle, according to another embodiment of the present invention.

With reference to FIG. 5a and according to another embodiment of the present device, a variant shape of the first and second upper pivot brackets 90, 92 are shown welded to the seat chassis 25 and upper arc 50 of the rear chassis (not shown), respectively, in a different configuration. The upper pivot joint 45 still serves the same purpose; however, a worker skilled in the art would appreciate that the first and second upper pivot brackets 90, 92 can be of various shapes and sizes while still performing in the same manner.

Figure 6:
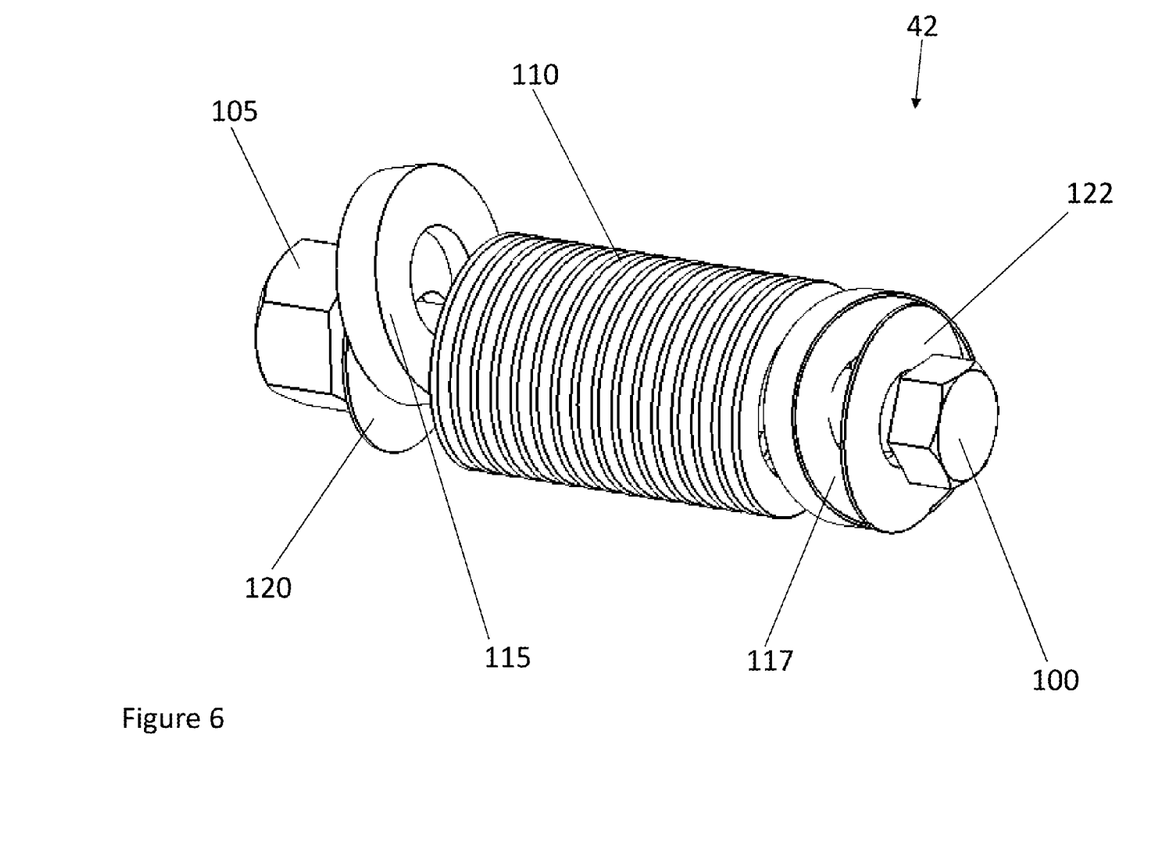
FIG. 6 is a perspective view of the pivot joint of the recumbent vehicle, according to one embodiment of the present invention.
Figure 7:
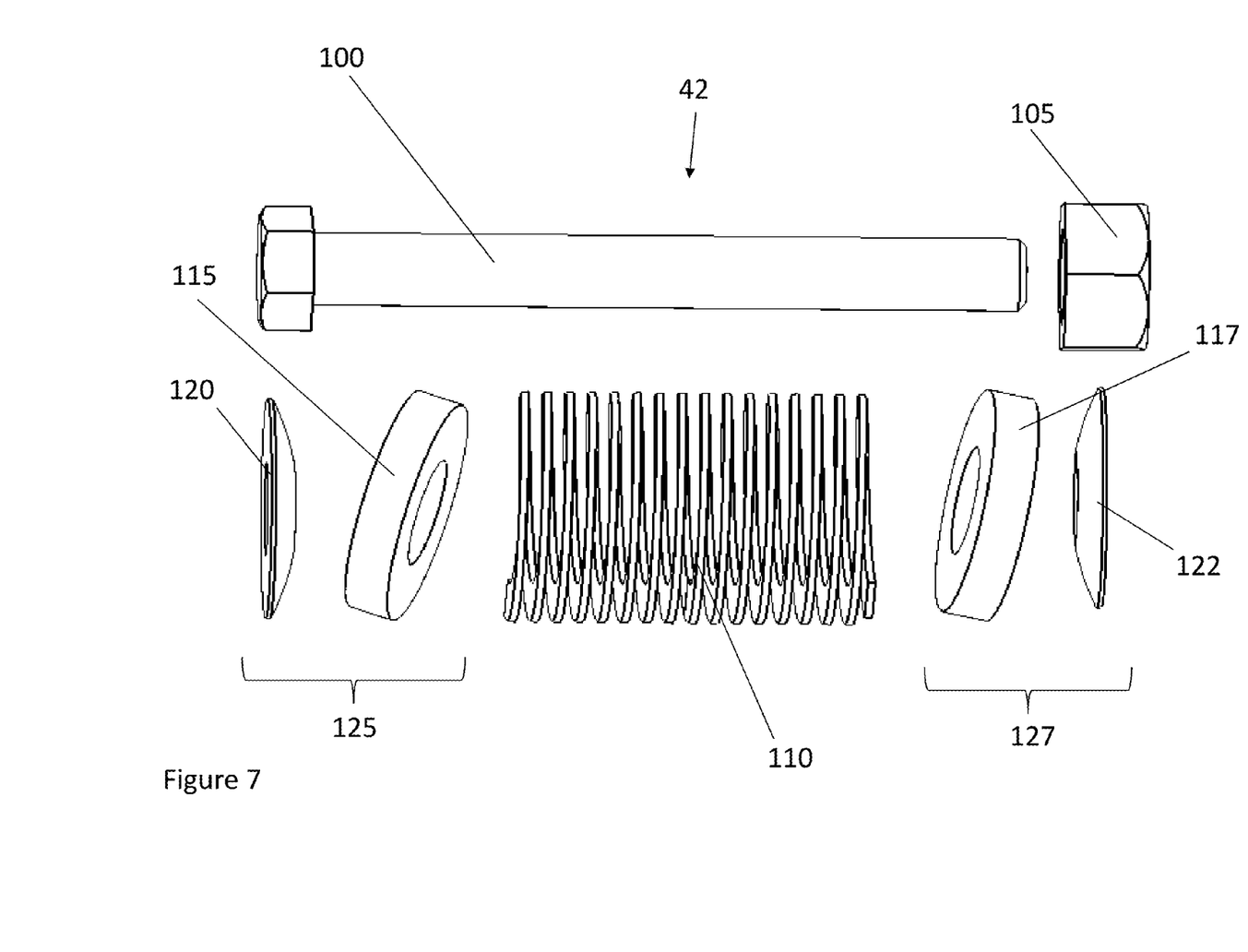
FIG. 7 is a view of a disassembled pivot joint of the recumbent vehicle, according to one embodiment of the present invention.

With reference to FIGS. 6 and 7 and according to one embodiment of the present device, a pivot joint 42 is shown. Both lower and upper pivot joints 40, 45 are identical and similarly identical to the pivot joint 42 and as such can be used interchangeably. In this embodiment, the pivot joint 42 is comprised of a bolt 100, a nut 105, a coil 110, first and second washers 115, 117 and first and second bearing pads 120, 122. Said first and second washers 115, 117 are concavely shaped in such a way so as to match to the corresponding semi spherical shape of the first and second bearing pads 120, 122. The corresponding first and second spherical axial bearings 125, 127 are well known in the art, such as the igubal® spherical axial bearings. When completely assembled, the first spherical axial bearing 125 is wedged in between one extremity of the bolt 100 and the coil 110, while the second spherical axial bearing 127 is wedged in between the coil 110 and the nut 105, as is illustrated in FIG. 6. In this embodiment, the specific conical shape of the first and second bearing pads 120, 122 allows for the coil 110, compressed between the first and second washers 115, 117, to have an lateral inclination of 7 degrees each side. The resulting lateral movement of the coil 110 along the surface of the first and second bearing pads 120, 122, allows for the front wheel (not shown) to tilt relative to the rear wheels (not shown).

With reference to FIGS. 4, 5, 6 and 7, and according to one embodiment of the present invention, the resulting shape of the assembled pivot joint 42 allows for the independent movement of the first lower pivot bracket 80 from the second lower pivot bracket 82, and similarly the independent movement of the first upper pivot bracket 90 from the second upper pivot bracket 92. Said resulting independent movement allows the rider in the recumbent vehicle (not shown), sitting in the seat chassis 25 to experience less centrifugal force and said seat chassis 25 will also absorb more of the impact from the debris or imperfections on the road. Indeed, if the seat chassis 25 was bolted onto the front and rear chassis 15, 20, the drive would succumb to significant centrifugal force resulting from the sharp and sudden turning of the recumbent vehicle (not shown), and the driver would uncomfortably absorb the impact from the road, resulting in an inconvenient and uncomfortable ride.

Figure 8:
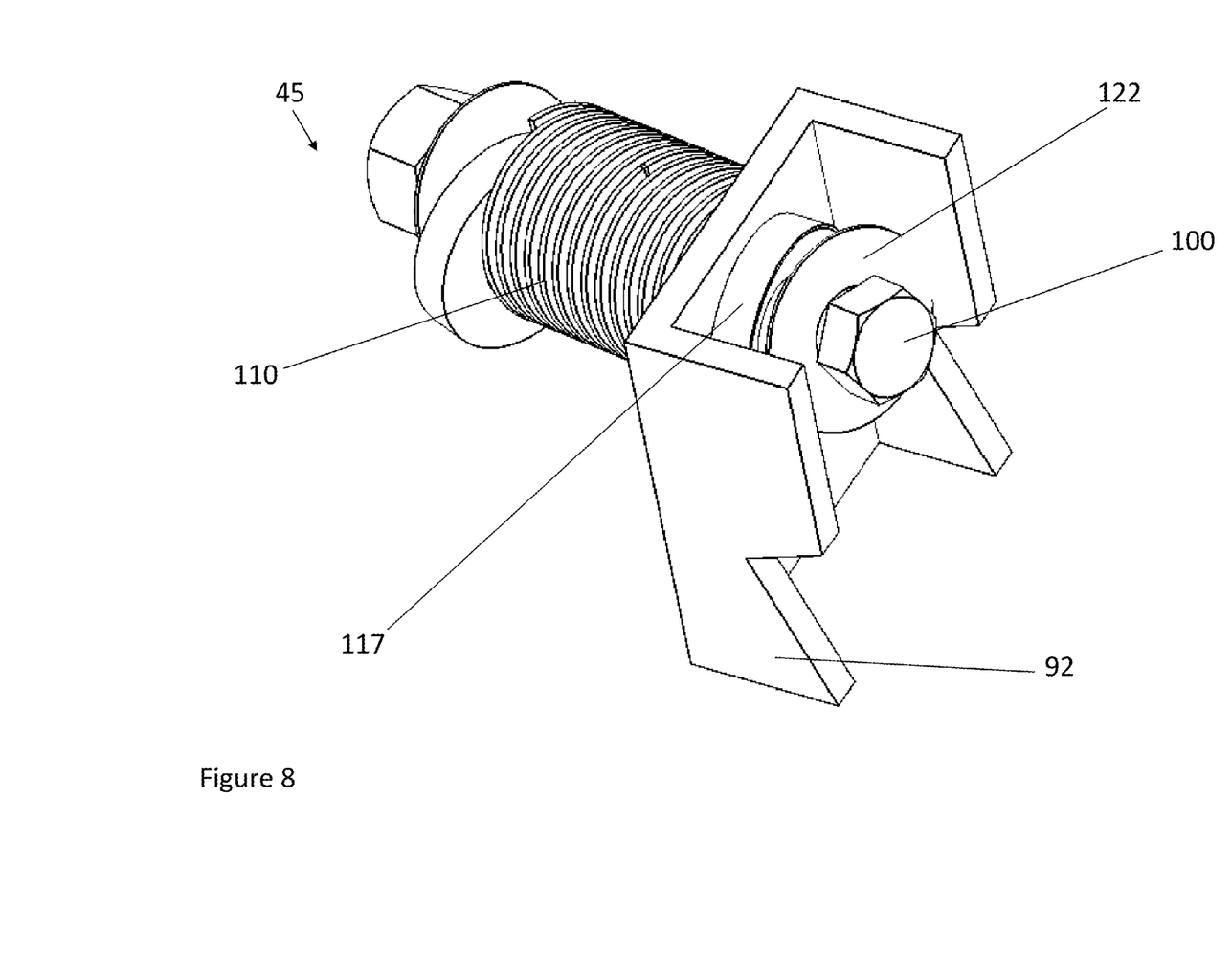
FIG. 8 is a perspective view of the upper pivot joint positioned onto the upper pivot bracket of the recumbent vehicle, according to one embodiment of the present invention.

With reference to FIG. 8 and according to one embodiment of the present device, the upper pivot joint 45 is connected to the second upper pivot bracket 92. As was described above, the second washer 117 is flush with the second upper pivot bracket 92, generally aligned with the aperture (not shown). The second bearing pad 122 makes contact with the second washer 117, and is wedged in between the extremity of the bolt 100 and said second washer 117. The coil 110 is located on the other side of the second upper pivot bracket 92, and is also loosely adjacent to the aperture (not shown) of the second upper pivot bracket 92. A worker skilled in the relevant art will appreciate that the first washer (not shown) and second washer 117 could be replaced by a similarly concavely-shaped aperture, or that the second upper pivot bracket could be shaped in such a way so as to have another concavely-shaped piece, providing that the second bearing pad can still loosely rotate around said piece or aperture. These minor modifications or any other that serves to recreate another type of concave washer would obviously not depart from the spirit and scope of the present device.

Figure 9:
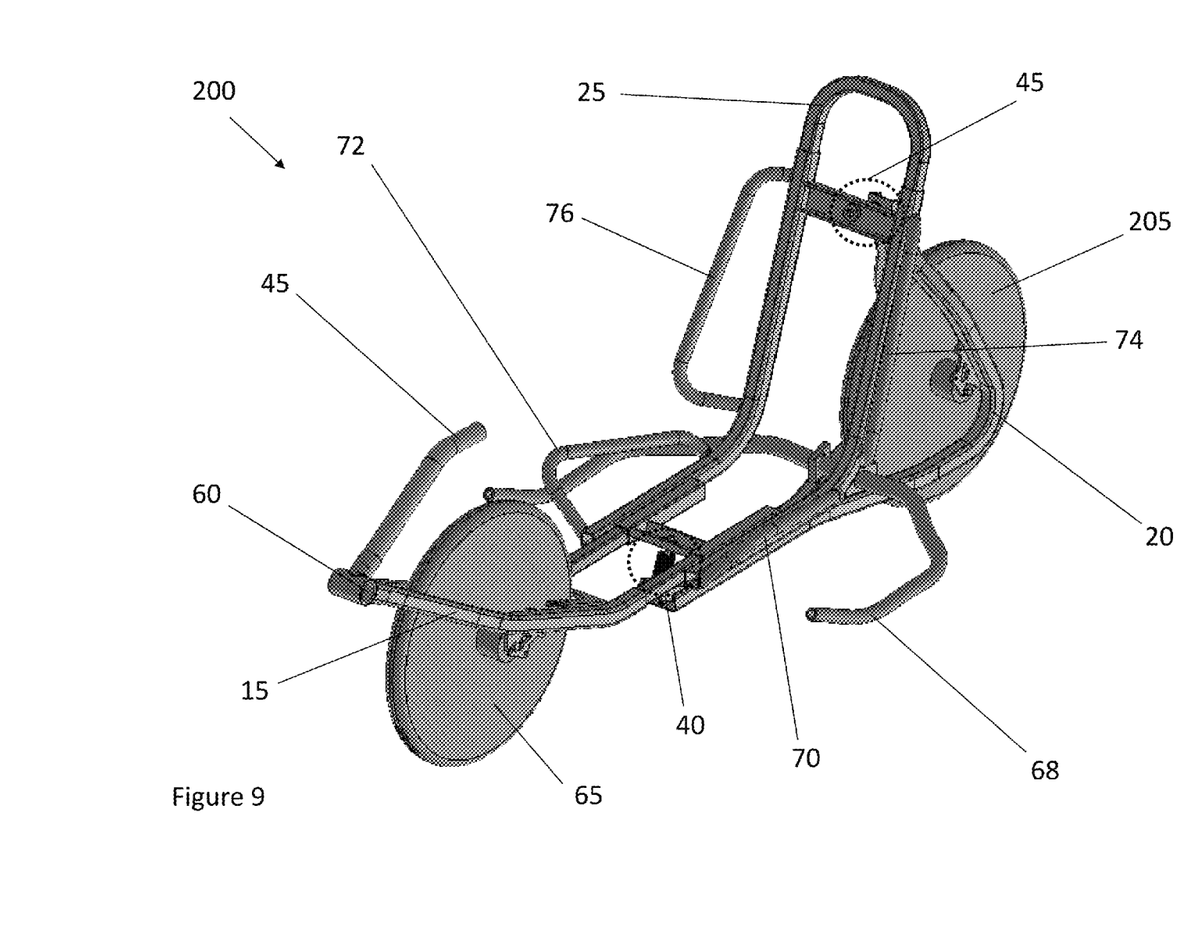
FIG. 9 is a front perspective view of a recumbent vehicle, according to a second embodiment of the present invention.

With reference to FIG. 9 and according to a second embodiment of the present invention, a recumbent vehicle 200 is shown, consisting generally of front, rear and seat chassis 15, 20 25. In this second embodiment, front and seat chassis 15, 25 are generally similar to that of the first embodiment for the recumbent vehicle (not shown) and serve the same purpose. Derailleur 45, pedal bracket 60, steering arm 68, front wheel 65, first, second, third and fourth seat supports 70, 72, 74, 76 and lower and upper pivot joints 40, 45 are also substantially similar to said first embodiment. The obvious difference between the recumbent vehicle 10 subject of the first embodiment and the recumbent vehicle 200 subject of the second embodiment is that said recumbent vehicle 200 is comprised of only a front wheel 65 and a single rear wheel 205; in other words, it is a bicycle instead of a tricycle. As was the case in the first embodiment, the rider utilizes the steering arm 68 in order to steer and balance the recumbent vehicle 200, whereby pushing and pulling on said steering arm 68 will veer the recumbent vehicle 200 one way or another. Said steering arm 68 will also connect with other components such as gear shifter (not shown) or brake actuator (not shown), and other components as habitual on a steering handle of a bicycle and known in the relevant art. In this second embodiment, rear chassis 20 is shaped in such a way so as to provide stability for the rear wheel 205 as well as the force exerted upon it by means of the seat chassis 25 through upper pivot joint 45.

Figure 10:
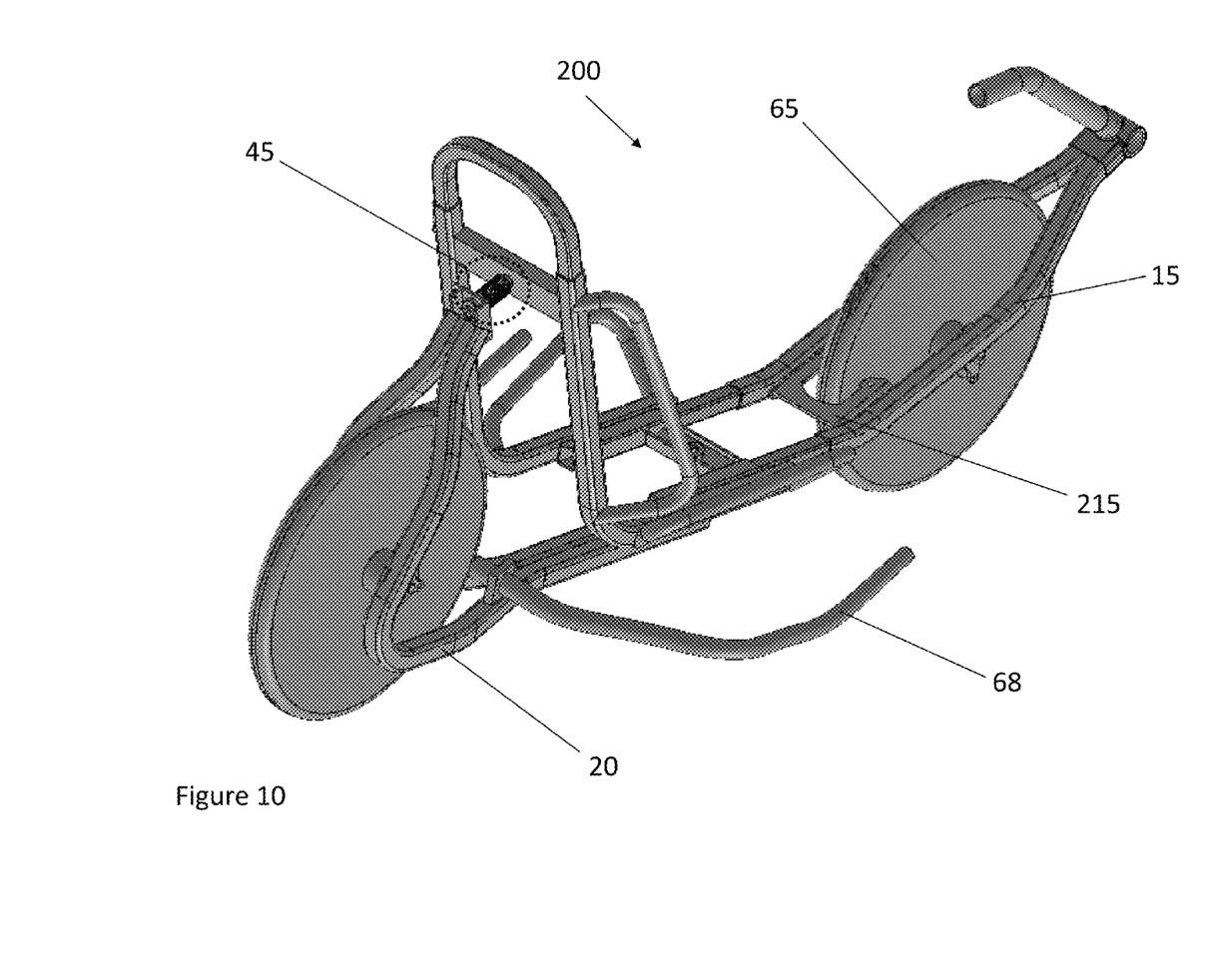
FIG. 10 is a rear perspective view of a recumbent vehicle, according to a second embodiment of the present invention; and, FIG. 11 is a side view of the seat and rear chassis of the recumbent vehicle, according to a second embodiment of the present invention.

With reference to FIG. 10 and according to a second embodiment of the present invention, rear chassis 20 is shown connected to the upper pivot joint 45. The steering arm 68 is also shown connected to the rear chassis 20, and extends outwardly from the rear chassis 20 such that the rider can easily grab said steering arm 68 and steer in a chosen direction by tilting the steering arm 68 side to side. A brake 215 is also shown fastened to the front chassis 15 and utilized in order for the rider to slow down or stop the front wheel 65 from rotating and thus slow down or stop the forward motion of the recumbent vehicle 200. While the inner components of the break 215 and accompanying system are not shown, a worker skilled in the relevant art would appreciate that said break 215 and break system (not shown) could be any type that is traditionally utilized with a recumbent vehicle, without departing from the spirit and scope of the present invention.

Figure 11:
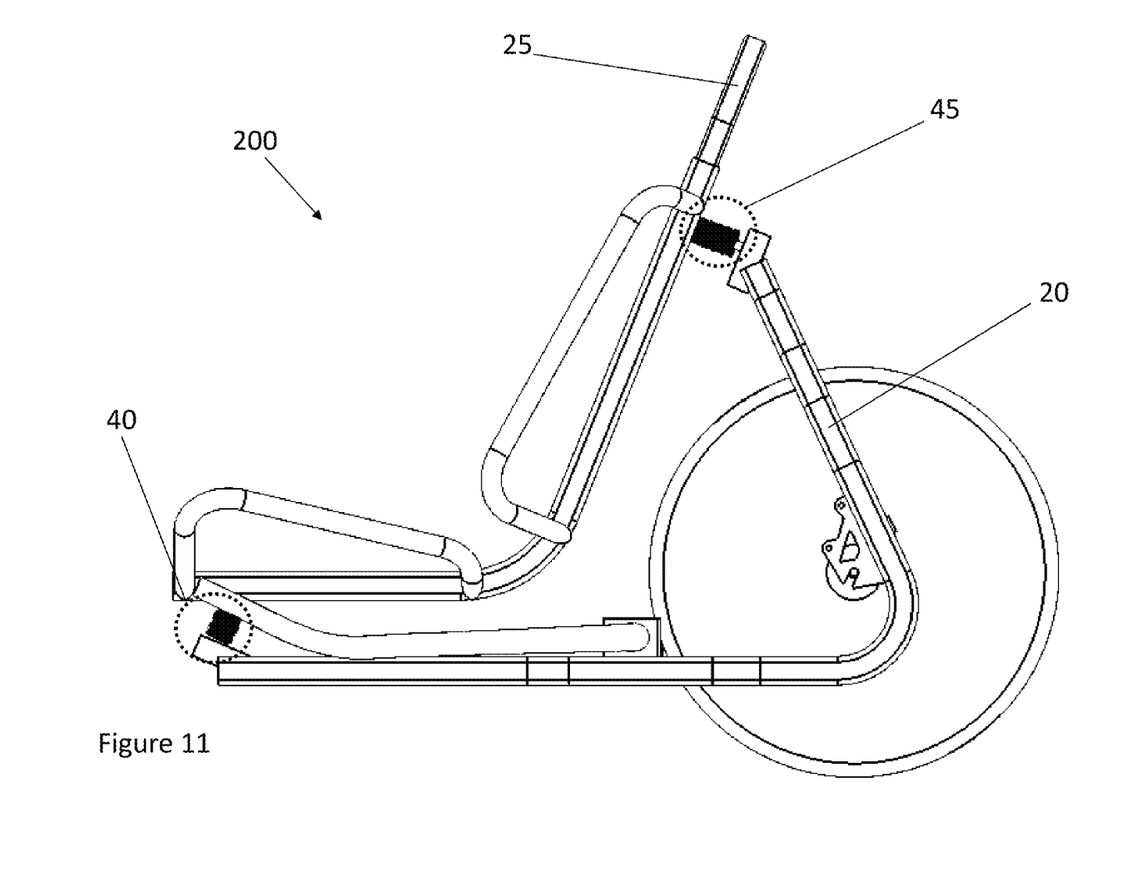

With reference to FIG. 11 and according to a second embodiment of the present invention, lower and upper pivot joints 40, 45 are connected to the lower chassis 20. As was previously explained, the new shape of the rear chassis 20 has rendered the function of the upper and lower arches (not shown), and brace (not shown) unnecessary. As such, the upper pivot joint 45 is connected directly to the rear chassis 20 and the rear chassis 20 can still serve to compensate for motion from the ride as experienced by the seat chassis 25 and ultimately by the upper pivot joint 45. It is to be understood that the lower and upper pivot joints 40, 45 of the recumbent vehicle 200 are comprised of the same subcomponents, thus are identical in shape, size and function as to the recumbent vehicle (not shown). As such, the recumbent vehicle 200 is more compact, maneuverable and versatile than a traditional bicycle, while still providing for the same advantages of comfort, maneuverability and riding pleasure found in said vehicle. Further, the recumbent vehicle 200 has increased stability at lower speeds while limiting the overall cage space of the vehicle.

Many modifications and other embodiments of the invention will come to the mind of a person skilled in the art having the benefit of the teachings presented in the foregoing description and associated drawings. Therefore, it is understood that the invention is not to be limited to the specific embodiment disclosed, and that modifications and embodiments are intended to be included within the scope of the appended claims.

Having thus described the invention, it is now claimed:

1. A recumbent vehicle comprising:
   a. a front chassis having a front wheel to provide a first point of support;
   b. a seat chassis secured to the front chassis for providing seating;
   c. a rear chassis pivotally connected to the seat chassis and having at least one rear wheel to provide a second point of support;
   d. upper and lower pivot joints operatively engaged with the seat chassis and rear chassis allowing the seat chassis to move independently from the front chassis and rear chassis, the upper and lower pivot joints further comprised of:
      i. a bolt:
      ii. a nut threaded to the bolt;
      iii. a coil positioned on the bolt; and,
      iv. first and second spherical axial bearings, positioned at each end of the bolt; and
   e. a steering arm fastened to the rear chassis to steer the recumbent vehicle, wherein the spherical axial bearings rotate and pivot one with respect to the other to create a pivotal connection between the seat chassis and the rear chassis.

2. The recumbent vehicle of claim 1 wherein the seat chassis is further comprised of first and second receiving brackets.

3. The recumbent vehicle of claim 2 wherein the front chassis is further comprised of first and second connecting brackets for insertion within said first and second receiving brackets.

4. The recumbent vehicle of claim 1 wherein the seat chassis is further comprised of first, second, third and fourth seat supports.

5. The recumbent vehicle of claim 4 wherein a material is affixed between the first and second seat supports and the third and fourth seat supports to create a seat.

6. The recumbent vehicle of claim 1 wherein the first and second spherical axial bearings are further comprised of first and second bearing pads and first and second washers.

7. The recumbent vehicle of claim 1 further comprised of upper and lower first and second pivot brackets.

8. The recumbent vehicle of claim 1 wherein the front chassis is further comprised of a derailleur support.

9. The recumbent vehicle of claim 1 wherein the front chassis is further comprised of a pedal bracket.

10. The recumbent vehicle of claim 1 wherein the rear chassis is further comprised of:
    a. upper and lower arches;
    b. a brace connecting the upper arch to the lower arch;
    c. a base support connected to the upper and lower arches.

* * * * *